Dec. 1, 1964  L. B. COURTOT ETAL  3,159,180
QUICK DISCONNECT VALVED COUPLING
Filed May 1, 1961  3 Sheets-Sheet 1

INVENTORS
LOUIS B. COURTOT
& JAMES FREDERICK NORTON
BY
RICHEY, McNENNY & FARRINGTON

William J. Flynn
ATTORNEYS

Dec. 1, 1964  L. B. COURTOT ETAL  3,159,180
QUICK DISCONNECT VALVED COUPLING
Filed May 1, 1961  3 Sheets-Sheet 2

INVENTORS
LOUIS B. COURTOT
& JAMES FREDERICK NORTON
BY
RICHEY, M°NENNY & FARRINGTON
William J. Flynn
ATTORNEYS Dec. 1, 1964 L. B. COURTOT ETAL 3,159,180
QUICK DISCONNECT VALVED COUPLING
Filed May 1, 1961 3 Sheets-Sheet 3
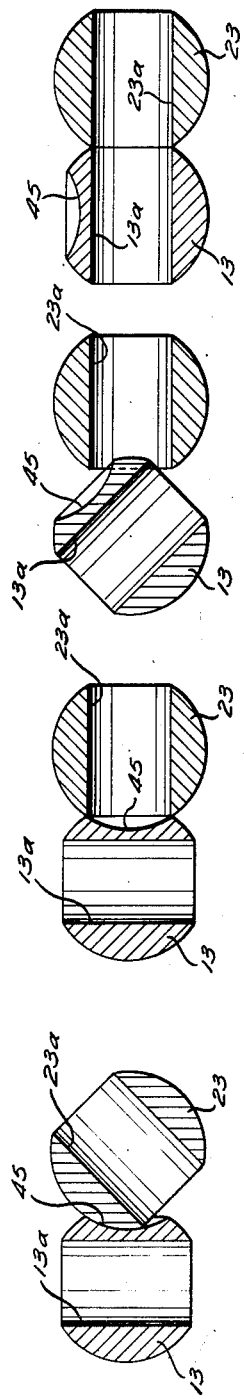
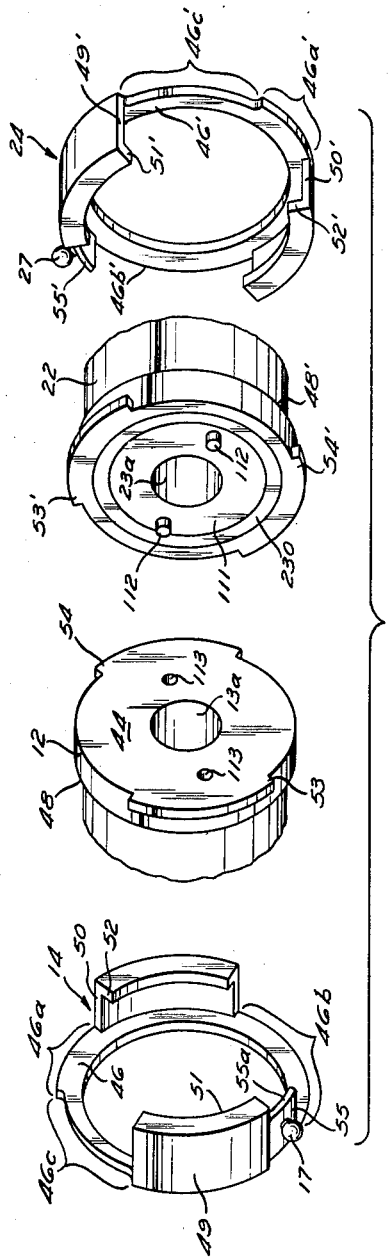
INVENTORS
LOUIS B. COURTOT,
& JAMES FREDERICK NORTON
BY
RICHEY, McNENNY, & FARRINGTON
William J. Flynn
ATTORNEYS United States Patent Office 3,159,180
Patented Dec. 1, 1964

3,159,180
QUICK DISCONNECT VALVED COUPLING
Louis B. Courtot, Euclid, and James Frederick Norton, Cleveland, Ohio, assignors to The Weatherhead Company, Cleveland, Ohio, a corporation of Ohio
Filed May 1, 1961, Ser. No. 106,905
8 Claims. (Cl. 137—614.06)

This invention relates to a valved coupling of the type which can be connected or disconnected quickly.

Heretofore, various fluid couplings have been proposed in which each half of the coupling carries a valve, which must be closed before the coupling halves can be disconnected and which may be opened after the coupling halves have been connected together. One of the serious disadvantages of prior couplings of this general type has been the trapping of fluid between the valves in the respective coupling halves.

The present invention is directed to a novel coupling which avoids this disadvantage by having the respective valves contiguous to one another when the coupling halves are connected together, so there is no fluid-trapping space between the valves. The valves may be turned between closed and open positions while they are contiguous to one another.

The novel coupling of the present invention is constructed to avoid any substantial pressure drop through the coupling and to provide positive locking of the respective valves in their open and closed positions, so that neither valve can be opened or closed inadvertenlty or improperly with respect to the positions of the coupling halves (i.e., whether the latter are connected or disconnected).

It is an object of this invention to provide a novel and improved valved coupling.

It is also an object of this invention to provide such a coupling which avoids the trapping of fluid between the valves in the coupling when the respective coupling halves are connected together.

Another object of this invention is to provide an improved valved coupling having a novel locking arrangement for automatically locking the respective valves in closed or open positions at appropriate times during the connection or disconnection of the respective halves of the coupling.

Further objects and advantages of this invention will be apparent from the following detailed description of a presently-preferred embodiment thereof, which is shown in the accompanying drawings.

In the drawings:

FIGURES 8-11 are similar views showing successive positions of the valves as they are opened;

FIGURE 12 is an exploded fragmentary perspective view showing the actuating ring and the front end of the valve body in both halves of the coupling.

*General Construction and Operation*

Figure 1:
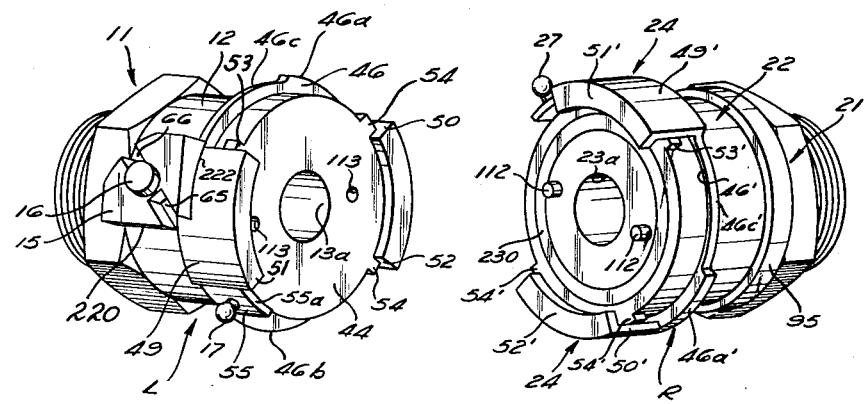
FIGURE 1 is an exploded perspective view showing the two halves of the present coupling disconnected from each other and with the respective covers for the coupling halves removed for clarity.

Referring first to FIGURE 1, the coupling assembly of the present invention comprises a pair of coupling halves or units designated generally by the reference characters L and R.

Figure 2:
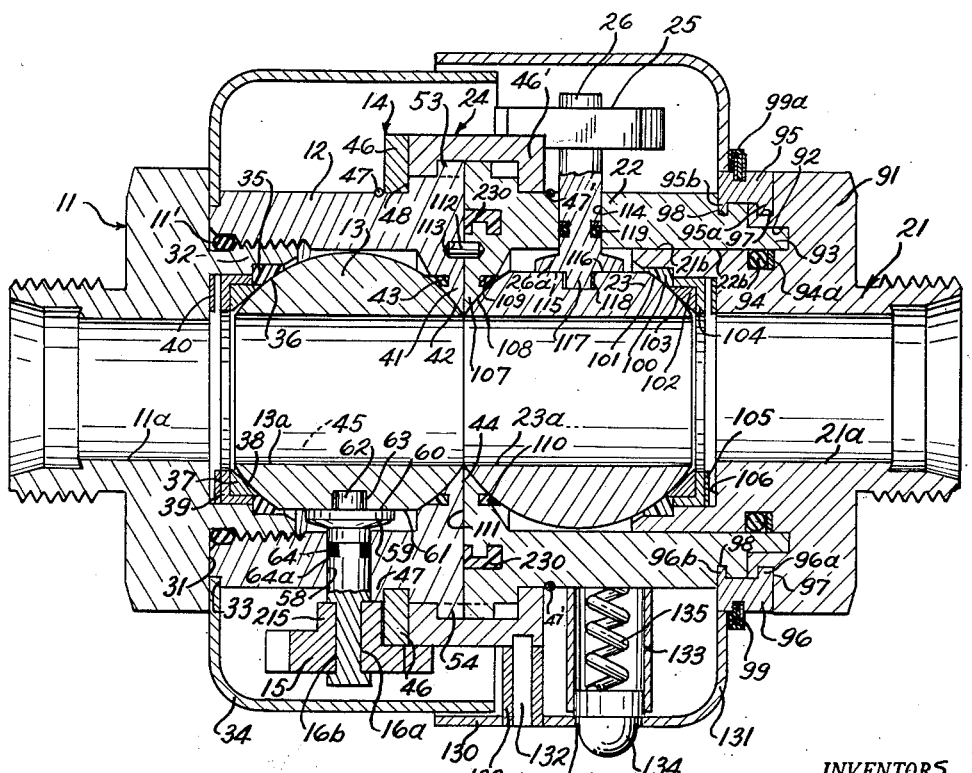
FIGURE 2 is an axial section through the coupling, showing the coupling halves connected to each other and with the respective valves in both coupling halves open.
Figure 3:
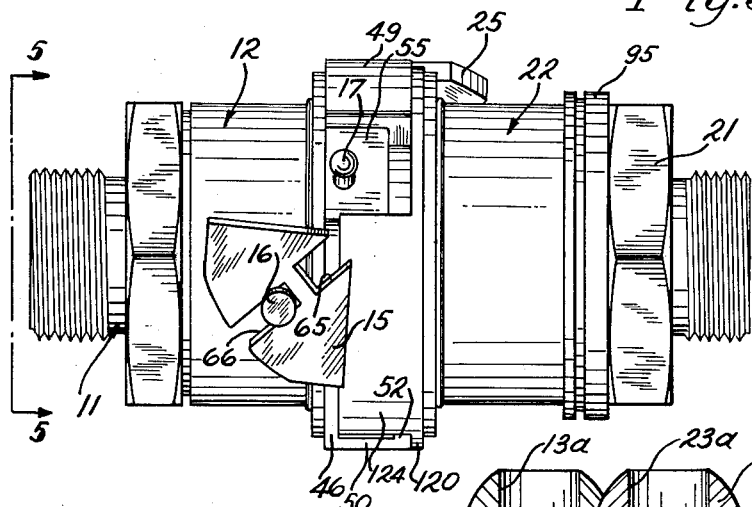
FIGURE 3 is a plan view of the coupling as shown in FIGURE 2, with the covers removed for clarity.

As shown in FIGURES 1 and 2, the left-hand coupling unit L in broad outline comprises a fitting 11 adapted to be attached to a hose or pipe, a generally annular valve body 12 threadedly attached to this fitting, a generally ball-shaped valve member 13 inside valve body 12 and rotatable about a vertical axis in FIGURE 2, and a valve-actuating ring 14 rotatably mounted on the outside of the valve body 12. A notched locking plate 15 at the outside of the valve body 12 is mounted on a rotatable stem 16 extending radially of the valve body and having a tongue-and-groove connection to the ball-shaped valve member 13 so that, when the locking plate 15 is turned, the valve member 13 is caused to turn about the axis of stem 16. A radially projecting pin 17 carried by the actuating ring 14 is arranged to turn the locking plate 15 when the actuating ring 14 is turned a predetermined amount around the valve body 12.

The right-hand coupling unit R in broad outline comprises a fitting 21 adapted to be attached to a hose or tube, a generally annular valve body 22 rotatably mounted on the fitting, a generally ball-shaped valve member 23 mounted inside the body 22 and rotatable about a vertical axis in FIGURE 2, a valve-actuating ring 24 rotatably mounted on the outside of the valve body 22, a notched locking plate 25 at the outside of the valve body 22 attached to a rotatable stem 26 extending radially of the valve body and having a tongue-and-groove connection to the valve member 23, and a radially projecting pin 27 on the actuating ring 24 for turning the locking plate 25 after the actuating ring 24 has been turned a predetermined amount around the valve body 22.

As shown in FIGURE 2, the ball valve member 13 in the lef-hand coupling unit L is formed with an axial bore 13a which, in the open position of valve member 13, as shown in FIGURE 2, forms a continuation of the bore 11a in the associated fitting 11. Likewise the ball valve member 23 in the right-hand coupling unit is formed with an axial bore 23a constituting a continuation of the bore 21a in the associated fitting 21 in the open position of valve member 23.

When the coupling units are disconnected, as shown in FIGURE 1, the respective ball valve members are sequentially displaced 90° (about the respective axes of stems 16 and 26) from the positions shown in FIGURE 2. That is, ball valve member 13 closes the passage through valve body 12 and ball valve member 23 closes the passage through valve body 22. The coupling units L and R can be disconnected from one another or connected together only when the valve members 13 and 23 are in their closed positions, as described in detail hereinafter.

Figure 7:
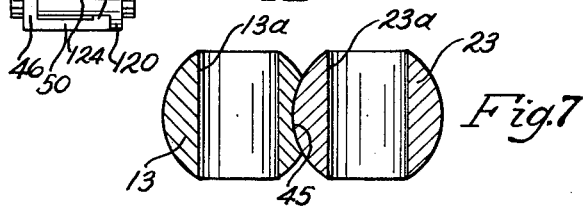
FIGURE 7 is a fragmentary axial section showing the positions of the two valves in the coupling just after the coupling halves have been brought together and before either valve has been opened.

In the use of the coupling, when the coupling units L and R are brought together their respective valve bodies 12 and 22 are in contiguous end-to-end relationship. The respective actuating and locking rings 14 and 24 interfit with one another circumferentially around the assembly, so that when one ring is turned the other turns with it. When the coupling units are first brought together, the respective ball valve members 13 and 23 are juxtaposed as shown in FIGURE 7, both being in their closed positions.

To lock the coupling halves together and open the valves (after the coupling units have been brought together) the actuating ring 24 is turned in one direction about the associated valve body 22. As just mentioned, the other actuating ring 14 turns with it. The relationships of the pins 17 and 27 to the respective notched locking plates 15 and 25 are such that, after a predetermined amount of turning of the actuating rings 14 and 24, the pin 27 first turns the locking plate 25 through 90°, causing the ball valve member 23 to turn 90° from its previous closed position to the open position. At this time the valves are positioned as shown in FIGURE 9.

Thereafter, upon continued turning of the actuating rings in the same direction, the pin 17 turns the locking plate 15 through 90°, causing the ball valve member 13 to turn 90° from its previous closed position to the open position.

With both valves now open, as shown in FIGURE 2, the coupling provides for the flow of fluid through it without any significant pressure drop.

When it is desired to disconnect the coupling, the actuating ring 24 is turned in the reverse direction. First, the pin 17 turns the locking plate 15 to re-close ball valve member 13 in the left-hand coupling unit L. As the actuating rings continue to turn in the reverse direction, pin 27 actuates locking plate 25 to re-close the ball valve member 23 in the right-hand coupling unit. Thereafter, the coupling units L and R may be separated from one another.

Having described the overall construction and operation of the coupling in general terms, a detailed description of the construction and mode of operation of the preferred embodiment will now be given.

Left-Hand Coupling Unit

Referring to FIGURE 2, the left-hand fitting 11 has an integral transverse flange 31 which is engaged by the back end of the valve body 12 and sealed thereto by means of an O-ring 11'. Beyond this flange the fitting presents an externally threaded annular collar 32, which is threadedly engaged by an internally threaded portion of the valve body 12.

The back end of the valve body 12 is formed with an annular peripheral recess 33 which receives the radially inturned back end of a sheet metal cover 34 which surrounds the valve body 12. The flange 31 on the fitting 11 abuts against this end of the cover and holds the cover in place.

At the inside of its threaded collar 32 the fitting 11 carries an annular seat 35, which preferably is of nylon, "Teflon" or other suitable self-lubricating material. This seat has a forwardly facing inside surface 36 which engages the valve member 13 and conforms to the latter's spherical curvature. The seat 35 is spring-pressed against valve member 13 by an annular retainer member 37 having a tapered front face 38 which extends tangent to the ball valve member 13, a flanged annular member 39 holding the retainer member and a Belleville spring washer 40 engaged between member 39 and the front of flange 31 on the fitting 11.

The front end of the valve body 12 has an integral, inturned, annular, tapered flange 41 which presents a spherically curved inner face 42 shaped complementary to the outside of the ball valve member 13. This flange is formed with an annular notch in which is seated an annular seal 43 of the same material as the previously-mentioned seat 35. Seal 43 engages and conforms to the curvature of valve member 13.

With this arrangement, the generally ball-shaped valve member 13 has a floating mounting inside the valve body 12, spring-biased against the seal 43. The seal 43 prevents leakage of fluid between ball valve member 13 and valve body 12.

As shown in FIGURE 2, the ball valve member 13 has truncated opposite ends, due to the presence of its wide axial bore 13a. The front end of the valve member in the open position, as shown in FIGURE 2, is co-planar with the adjacent flat, annular front surface 44 on valve body 12. Midway between its truncated opposite ends the valve member 13 is formed with a spherically-curved peripheral recess 45 on one side, which is shaped complementary to the spherical periphery of the ball valve member 23 in the right-hand coupling unit R and has a maximum diameter equal to the bore 23a in the latter, as best seen in FIGURES 7–11.

The actuating ring 14 in the left-hand half of the coupling has an annular back wall 46 which is rotatably mounted on the outside of the valve body 12, being confined axially between a snap ring 47 and a rearwardly-facing annular shoulder 48 on the valve body 12, as shown in FIGURE 2. Actuating ring 14 has on its periphery a pair of circumferentially spaced, forwardly projecting, arcuate flanges 49 and 50 (FIGURES 1 and 12) which terminate in radially inwardly extending arcuate lips 51 and 52 spaced in front of the front end face 44 of the valve body 12.

As shown in FIGURE 12, the back wall 46 of actuating ring 14 has arcuate, peripheral edge portions 46a and 46b extending circumferentially from opposite ends of the forwardly projecting flange 50. These edge portions 46a and 46b are at the same radial distance from the axis of ring 14 as the outer surfaces of the flanges 49 and 50.

Between the edge portion 46a and the adjacent end of flange 49, the back wall 46 of actuating ring 14 has an arcuate, peripheral edge portion 46c, which is at a shorter radial distance from the axis of the ring than the edge portion 46a.

The actuating ring 14 has an integral arcuate segment 55 disposed between the edge portion 46b and the adjacent end of flange 49. Segment 55 is at a shorter radial distance from the axis of the ring than the edge portion 46b. The radial pin 17 is mounted on segment 55 at a location spaced from the adjacent end of flange 49. The front edge 55a of segment 55 is co-planar with the front face 44 of valve body 12.

As best seen in FIGURES 1 and 12, the valve body 12 is formed at its front face 44 with a pair of circumferentially spaced, radially outwardly projecting, arcuate ribs 53 and 54, each having a substantial extent circumferentially.

The stem 16 for rotating valve member 13 extends through a radial opening 58 (FIGURE 2) in the annular side wall of valve body 12. At its inner end the stem 16 has an integral enlarged head 59 having a flat surface 60 engaging a flat surface 61 on valve member 13. An integral rectangular tongue 62 on the stem is received in a rectangular groove 63 formed in the periphery of valve member 13 at the middle of the flat surface 61 thereon. As shown in FIGURE 2, there is a clearance between the tongue 62 and groove 63 which permits a certain degree of adjustment of valve member 13 with respect to stem 16. The stem 16 carries an O-ring 64 provided with a backing ring 64a. This O-ring provides a fluid-tight seal against the wall of the opening 58.

The locking plate 15 is coupled to the outer end of stem 16 so that they turn together. As best seen in FIGURE 1, the locking plate 15 has a pair of diametrically opposed rectangular slots 65 and 66, which are open at the periphery of the plate.

As shown in FIGURE 2, near its outer end the stem 16 is cut away to provide oppositely disposed, parallel flat surfaces 16a and 16b. This cut-away portion of the stem is snugly, but slidably, received in the aforementioned rectangular slot 66 in locking plate 15.

Figure 4:
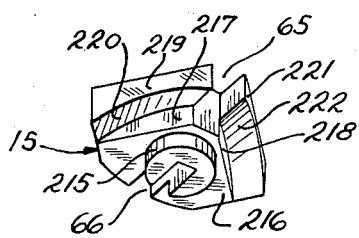
FIGURE 4 is a bottom perspective view of the valve locking plate on one of the coupling halves.

Referring to FIGURE 4, at its radially inward side the locking plate 15 has an integral shank 215 of generally cylindrical outline. The rectangular slot 66 extends into this shank. As shown in FIGURE 2, when the locking plate 15 is on the stem 16 the shank portion 215 just clears the back wall 46 of the actuating ring 14 so that the locking plate 15 may turn.

The radial position of the edge portion 46c on actuating ring 14 is such that the locking ring 15 may be assembled onto the stem 16 only when this edge portion of the actuating ring is opposite the stem. In this position of the parts, the inner end of the shank 215 on the locking plate 15 can clear the back wall 46 of the actuating ring, so that it may be slipped onto the stem 16, with its slot 66 receiving the cut-away portion of the stem. Except in this position, the radial extent of the back wall 46 of the actuating ring 14 is such that the locking plate 15 can be neither inserted on, nor detached from, stem 16.

As shown in FIGURE 4, the locking plate 15 presents a flat face 216 at the juncture between the shank 215 and the main body of this plate. This face extends perpendicular to the axis of stem 16. Beyond this face 216 the locking plate 15 presents a pair of transverse flat stop faces 217 and 218. These faces extend perpendicular to face 216 and perpendicular to each other. They extend on opposite sides of slot 65 at the latter's inner end.

Beyond the stop face 217 the locking plate 15 presents a projecting lip 219 having an arcuate inner face 220. Similarly, beyond the stop face 218 the locking plate presents a projecting lip 221 having an arcuate inner face 222. The arcuate faces 220 and 222 each has a radius of curvature just slightly larger than that of the major diameter portions of the actuating ring 14 (not including the pin 17).

In one position of the locking plate 15 angularly about the axis of stem 16, its flat stop face 217 is just behind the back wall 46 of the actuating ring 14 while the arcuate surface 220 closely fits surface 49 of actuating ring 14. This prevents locking plate 15 from being turned except when the reduced diameter arcuate segment 55 on actuating ring 14 is at the locking plate. The radial position of segment 55 is such that the flat face 216 on the locking plate 15 can just clear the actuating ring when the locking plate is turned while segment 55 is adjacent the locking ring.

Also, when the flat stop face 217 on locking plate 15 is just behind the back wall 46 of actuating ring 14, the arcuate surface 220 on the locking plate will be positioned closely overlying the periphery of the actuating ring. This also prevents turning of the locking plate except when segment 55 on the actuating ring is at the locking plate.

In another angular position of the locking plate 15 angularly about the axis of stem 16, its flat stop face 218 is just behind the back wall 46 of actuating ring 14 and its arcuate face 222 closely overlies the periphery of the actuating ring. Therefore, the locking plate can be turned from this position only when arcuate segment 55 on the actuating ring is at the locking plate.

As shown in FIGURE 1, when the ball valve 13 is closed the angular position of locking plate 15 is such that its arcuate surface 222 overlies the periphery of the actuating ring 14, extending partially across the arcuate flange 49 on the actuating ring. Also, at this time the aforementioned flat stop face 218 on locking plate 15 is just behind the back wall 46 on the actuating ring. Because of the locking actions provided by its aforementioned surfaces 222 and 218, the locking plate 15 cannot be turned at this time. At this time the slot 65 is positioned to receive the pin 17 on the actuating ring 14 when the latter is turned clockwise from the position shown in FIGURE 1.

When actuating ring 14 is so turned, the pin 17 enters into slot 65 in the locking plate 15. The locking plate 15 now can turn because the diametrically reduced arcuate segment 55 on the actuating ring 14 is beneath the locking plate.

As pin 17 moves past the locking plate 15 it turns the latter 90° about the axis of stem 16, causing the stem and valve member 13 to turn 90° to the open position of the valve. Now the arcuate segment 55 of actuating ring 14 has moved past the locking plate 15 and the arcuate face 220 on the locking plate closely overlies the peripheral edge portion 46b of the back wall 46 of actuating ring 14 and the flat stop surface 217 on the locking plate is directly behind the back wall 46 of the actuating ring. Therefore, locking plate 15 now cannot turn until the arcuate segment 55 on actuating ring 14 is again at the locking plate.

*Right-Hand Coupling Unit*

Referring to FIGURE 2, the fitting 21 in the right-hand coupling unit R has an integral transverse flange 91 formed with a forwardly-facing annular groove 92 which rotatably receives the reduced, cylindrical back end 93 of the valve body 22. An O-ring 94, provided with a backing ring 94a, provides a seal between the fitting 91 and the inside of the valve body 22 at the latter's back end. On either side of the O-ring 94 the fitting 21 presents a smooth cylindrical periphery 21b which is slidably engaged by the cylindrical inside surface 22b of the valve body 22.

A pair of half-rings 95 and 96 extend around the fitting 91 and the valve body 22 where they interfit. These rings are formed with axially spaced, radially inwardly projecting flanges 95a, 95b and 96a, 96b, respectively, which are received in correspondingly located annular peripheral recesses 97 and 98 in the fitting 21 and the valve body 22, respectively. The half-rings are held in place by split retaining rings 99 engaged by a lock tab washer 99a.

With this construction, the fitting 21 and the valve body 22 are held together against relative movement axially with respect to one another, while leaving the valve body free to turn with respect to the fitting, and vice versa.

Inside the valve body 22 the fitting 21 carries an annular seat 100 of self-lubricating material, such as nylon or "Teflon." This seat has a forwardly-facing inside surface 101 which engages the outside of the ball valve members 23 and conforms to the latter's spherical curvature. Seat 100 is spring-biased against valve member 23 by an annular retainer member 102 having a tapered front face 103 extending tangent to the valve member 23, a flanged annular member 104 which holds the retainer member, and a Belleville spring washer 105 which is engaged between the back end of member 104 and an annular forwardly-facing shoulder 106 on fitting 21.

At its front end the valve body 22 has an integral, inturned, tapered, annular flange 107 which presents a spherically curved inner face 108 shaped complementary to the outside of ball valve member 23. This flange has an annular notch 109 in which is seated an annular seal 110 engaging the valve member 23.

With this arrangement the valve member 23 has a floating mounting inside the valve body 22. The seal 110 prevents leakage of fluid between valve member 23 and valve body 22.

As shown in FIGURE 2, the ball valve member 23 is of the same size as valve member 13, having truncated opposite ends due to the presence of its wide axial bore 23a. The front end of valve member 23 in the latter's open position, as shown in FIGURE 2, is co-planar with the adjacent flat, annular front end face 111 on valve body 22.

The valve body 22 carries a pair of forwardly projecting dowel pins 112 which are adapted to be received in corresponding holes 113 formed in the front face 44 of the valve body 12, as best seen in FIGURE 1.

When the coupling units are assembled together, the front face 44 on valve body 12 abuts against the front face 111 on valve body 22. A conventional annular face seal 230 is carried by the valve body 22 for sealing engagement with the front face 44 of valve body 12.

The stem 26 for turning valve member 23 extends through a radial opening 114 in the annular side wall of valve body 22. At its inner end the stem has an enlarged head 26a with a flat surface 115 engaging a flat 116 on the valve member 23. A projecting rectangular tongue 117 on the stem is received in a groove 118 in the valve member 23 at the middle of the flat 116 thereon. As shown in FIGURE 2, there is a clearance between this tongue and groove, as in the other coupling unit. Stem 26 carries an O-ring 119, having a backing ring 119a, which provides a fluid tight seal against the wall of the opening 114.

The locking plate 25 is fixedly attached to the outer end of stem 26 so that they turn together. Locking plate 25 is identical to the locking plate 15 on the other coupling unit L and is arranged to coact with the corresponding actuating ring 24 in the same manner.

The actuating ring 24 for the right-hand coupling unit R is essentially the same as the actuating ring 14 in the left-hand coupling unit. The corresponding elements of ring 24 are given the same reference numerals as those for ring 14, but with a "prime" added. As shown in FIGURE 2, ring 24 has an annular back wall 46' which is rotatably mounted on the outside of the valve body 22, being confined axially between a snap ring 47' and a rearwardly facing annular shoulder 48' on the valve body. This actuating ring has a pair of circumferentially spaced, arcuate, forwardly projecting flanges 49' and 50' (FIGURES 1 and 12) which terminate in radially inwardly projecting arcuate lips 51' and 52', respectively, disposed beyond the front of valve body 22.

The pin 27 is attached to an arcuate segment 55' on this actuating ring located circumferentially just beyond one end of the arcuate segment 49'. The radially outer surface of segment 55' is disposed closer to the axis of the coupling unit than the radially outer surfaces of arcuate segments 49' and 50'. The front face of arcuate segment 55' is co-planar with the front face 111 of valve body 22.

The back wall 46' of this actuating ring has peripheral edge portions 46a', 46b' and 46c' (FIGURE 12) corresponding to the correspondingly numbered portions on the actuating ring 14 in the left-hand coupling unit.

As shown in FIGURE 1, valve body 22 is formed with a pair of radially outwardly projecting arcuate ribs 53' and 54' which are spaced behind the respective lips 51' and 52' on the front end of the actuating ring 24 and project circumferentially beyond the respective arcuate flanges 49' and 50' on actuating ring 24 when the coupling units are disconnected, as shown in FIGURE 1. The front faces of these ribs 53' and 54' are co-planar with the flat front face 111 of valve body 22, as shown in FIGURE 2.

The flange lip 51' on the actuating ring 24 of the right-hand unit is shaped, dimensioned and positioned to slide lengthwise over the outside of the valve body 12 in the left-hand coupling unit between one end of rib 53 and the adjacent end of rib 54. Similarly, the lip 52' on the other flange is shaped and dimensioned to slide over the outside of valve body 12 between the opposite end of rib 53 and the nearby end of rib 54. Likewise, the respective flange lips 51 and 52 on the actuating ring 14 of the left-hand coupling unit are constructed and arranged to slide lengthwise over the outside of the valve body 22 in the right-hand coupling unit between the ribs 53' and 54'.

The respective coupling units can be brought together only when the dowels 112 register with the corresponding openings 113. When the coupling units have been brought together the lips 51' and 52' on the actuating ring 24 of the right-hand unit abut against the front face of the back wall 46 of the actuating ring 14 in the left-hand coupling unit. Similarly, the lips 51 and 52 on actuating ring 14 abut against the front face of the back wall 46' on the actuating ring 24 in the right-hand coupling unit. Now, when actuating ring 24 in the right-hand coupling unit is turned, its lips 51' and 52' engage behind the respective ribs 54 and 53 on the valve body 12 in the left-hand coupling unit, and the lips 51 and 52 on the actuating ring 14 in the left-hand coupling unit engage behind the respective ribs 53' and 54' on the valve body 22 in the right-hand coupling unit. This locks the coupling units together and prevents their being pulled apart axially.

A cover 130 for the right-hand coupling unit has a radially inturned flange 131 at its back end which is rotatably mounted on the outside of the half rings 95 and 96, as shown in FIGURE 2. This cover carries a plurality of radially inwardly projecting coupling pins 132 which seat in corresponding recesses in the actuating ring 24 for the right-hand coupling unit, so that the actuating ring turns with the cover. A guide sleeve 132a is provided for each pin 132.

Attached to the valve body 22 is a radially outwardly projecting sleeve 133 in which a locking member 134 is slidable. A spring 135 biases the locking member 134 radially outward. The cover 130 has a pair of circumferentially spaced openings 136 which are positioned to receive the locking member 134 only when the cover 130 and actuating ring 24 have been turned to the "valve open" position, as shown in FIGURE 2, or the "valve closed" position. This releasably locks the assembled coupling in either of these positions.

The present coupling has provision for locking each actuating ring 14 or 24 in the proper position to maintain the respective ball valves 13 and 23 closed when the coupling halves are detached from one another.

Figure 13:
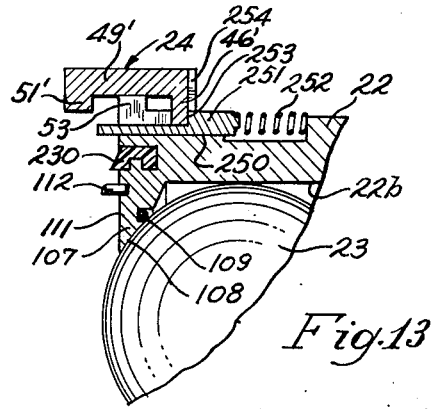
FIGURE 13 is a fragmentary section of one coupling half showing the lock for its actuating ring.

FIGURE 13 shows the lock for the right-hand coupling half. It is to be understood that an identical lock is provided for the left-hand coupling half.

Referring to FIGURE 13, at a location just radially inward from the actuating ring 24 the valve body is formed with a lengthwise peripheral slot 250 in which a locking member 251 is slidable. This slot 250 is offset circumferentially from the valve shaft bore 114 in the valve body. A spring 252 biases locking member 251 forward, so that normally it projects beyond the front end face 111 of valve body 22. In this position a shoulder 253 on locking member 251 seats in a radial slot 254 formed in the back wall 46' of actuating ring 24.

With this construction, when the coupling halves are separated, locking member 251 locks the actuating ring 24 against turning with respect to valve body 22.

However, when the coupling halves are brought together the projecting front end of locking member 251 will first engage the front end face 44 of the valve body in the other coupling unit, after which locking member 251 will be retracted against the bias exerted by its spring 252. With the locking shoulder 253 out of its slot 254, the actuating ring 14 now is free to turn on valve body 22.

The lock slot 254 on actuating ring 14 is so located that the actuating ring will be positioned angularly on valve body 22 as shown in FIGURE 1 when the coupling halves are disconnected. The same arrangement is provided on the left-hand coupling unit. This insures that, when the coupling halves are disconnected, as shown in FIGURE 1, the actuating rings will be positioned so that the coupling halves may be brought together in the manner described, with the actuating rings 14 and 24 interfitting circumferentially and the valve bodies 12 and 22 abutting end-to-end.

*Operation*

As pointed out at the beginning of this description, the respective ball valves 13 and 23 are in their closed positions when the left and right-hand coupling units are detached from each other, as shown in FIGURE 1. At this time, the respective actuating rings 14 and 24 are locked on each coupling half, thereby insuring that the ball valves remain closed.

Figure 6:
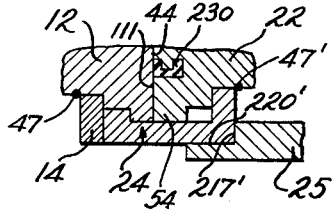
FIGURE 6 is a fragmentary section taken along the line 6—6 in FIGURE 5 and showing the coaction between the locking plate and the actuating ring in the right hand coupling half of the assembly.

With the valves closed, the coupling units are brought together lengthwise. This can be done only if the actuating rings are positioned as shown in FIGURE 1, insuring that the ball valves are closed. Both locking plates 15 and 25 coact with the back walls and peripheral surfaces of the respective actuating rings 14 and 24 so that neither locking plate may turn. Therefore, both valves 13 and 23 remain locked closed. FIGURE 6 shows the coaction between locking plate 25 and actuating ring 24 at this time, the stop faces 217' and 220' on the locking plate corresponding to the faces 217 and 220 on locking plate 15 as shown in FIGURE 4.

Figure 5:
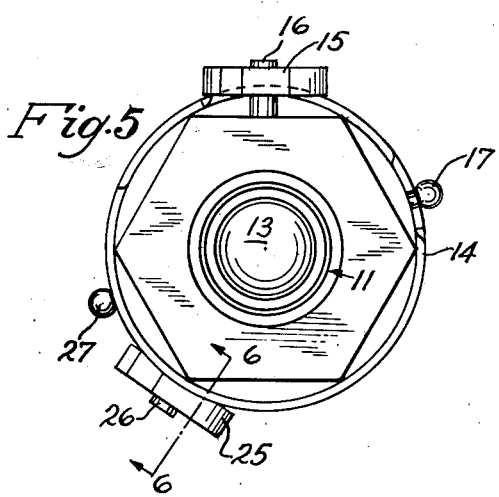
FIGURE 5 is a left end elevational view of the coupling just after the two halves of the coupling have been brought together and before either valve has been opened.

After the coupling units have been brought together in this manner, the cover 130 and actuating ring 24 in the right-hand coupling unit are turned counter-clockwise in FIGURE 5 to lock the coupling halves to one another and to open the valves.

FIGURE 5 shows the positions of the pins 17 and 27 with respect to the respective locking plates 15 and 25 just after the coupling units have been brought together. FIGURE 7 shows the positions of the ball valve members 13 and 23 at this time. Note that the spherically curved recess 45 in valve member 13 faces toward, and receives a portion of, the other valve member 23.

After the actuating rings 24 and 14 have been turned about 28° counter-clockwise from their starting positions, the pin 27 carried by actuating ring 24 will have entered a notch in the locking plate 25 and will have turned this locking plate 45°. This has caused the valve member 23 in the right-hand coupling unit to turn 45° to the position shown in FIGURE 8. Such turning of valve member 23 is possible only because of the presence of the confronting complementary concave recess 45 in the other valve member 13. Valve member 13 has remained stationary, as shown in FIGURE 8.

Referring to FIGURE 9, after the actuating rings 24 and 14 have been turned about 40° from their starting positions the pin 27 will have turned the locking plate 25 through 90° and will have moved out of the notch in this locking plate. This has caused the valve member 24 in the right-hand coupling unit to turn to its open position, as shown in FIGURE 9. Valve member 13 in the left-hand coupling unit has remained in its closed position.

Referring to FIGURE 10, after the actuating rings have been turned about 62° from their starting positions, the pin 17 on actuating ring 14 will have entered notch 65 in locking plate 15 and will have turned the latter 45°. This has caused valve member 13 in the left-hand coupling unit to turn 45°. Such turning of valve 13 is possible only because the bore 23a in valve member 23 now is directly opposite the front of valve member 13, as shown in FIGURE 10.

As shown in FIGURE 11, after the actuating rings have been turned about 94° from their starting positions the pin 17 will have turned the locking pltae 15 through 90° and will have moved beyond this locking plate. Consequently, the valve 13 will have been turned 90° to its open position, as shown in FIGURE 11. In this position of the actuating rings, the various parts of the coupling will be positioned as shown in FIGURE 2, with both valves 13 and 23 being open and providing a flow passage axially through the coupling which produces substantially no pressure drop. The locking member 134 now projects into one of the openings 136 in cover 130 to releasably lock the parts in this position.

Also, in this position of the parts the lips 52' and 51' on the actuating ring 24 of the right-hand coupling unit will be disposed throughout their entire arcuate lengths behind the ribs 54 and 53 on the valve body 12 in the left-hand coupling unit. Also, the lips 51 and 52 on the actuating ring 14 of the left-hand coupling unit will be completely behind the rib 54' and 53' on the valve body 22 in the right-hand coupling unit. Thus, the coupling units are securely locked together and they cannot be pulled apart axially.

When it is desired to disconnect the coupling, the locking member 134 is pushed in manually and then the cover 130 is turned in the opposite direction. The valves 13 and 23 close in a sequence opposite to the sequence in which they opened. That is, starting with the coupled, "valve open" position of FIGURE 11, the various parts progress back through the conditions shown in FIGURES 10, 9 and 8 (in that order) to the position of FIGURE 7, in which both valves are closed. A slight additional turn of the cover 130 in the same direction will be sufficient to disengage the respective lips 51', 52', 51 and 52 completely from the ribs 54, 53, 54' and 53', so that the coupling members may be pulled apart from each other.

As best seen in FIGURE 2, when the coupling halves are connected together and the respective valves therein are both open, there is no space between the valves in which fluid or air can be trapped. Despite the absence of a space between them, it is possible to turn the valves between closed and open positions, as described. Also, the arrangement of the valves is such that there is no appreciable pressure drop through the coupling.

While a particular, presently-preferred embodiment of this invention has been described in detail and illustrated in the accompanying drawings, it is to be understood that various modifications, omissions and refinements which depart from the disclosed embodiment may be adopted without departing from the spirit and scope of this invention.

What is claimed is:

1. A valved coupling comprising a pair of coupling units detachably connected to each other, each coupling unit including a valve movable between open and closed positions, said valves extending contiguous to each other when said coupling units are connected to each other, and an individual valve actuating means on each coupling unit for opening and closing the respective valve therein, the respective individual valve actuating means being coupled to each other for unitary operation to open and close the respective valves individually and sequetially one after the other.

2. A valved coupling comprising a pair of coupling units detachably connected to each other, each of said coupling units comprising a valve movable between open and closed positions and an actuating ring rotatable about the axis of the respective coupling units, said actuating rings having portions which interfit and couple the rings together for rotation in unison when the coupling units are connected to one another, said valves extending contiguous to one another when the coupling units are connected to each other, each coupling unit having a locking member coupled to the respective valve to open and close the latter, the actuating ring in each coupling unit being turnable past the respective locking member and blocking the latter against movement except during a limited angular range of positions of the respective actuating ring, and means on each actuating ring for moving the respective locking member as the actuating ring is turned through said limited angular range, the actuating rings interfitting with each other such that one locking member is moved before the other locking member as the actuating rings are turned in unison so that their respective valves are moved between open and closed positions sequentially one after the other.

3. A valved coupling comprising a pair of coupling units detachably connected to each other, each coupling unit comprising a valve housing, a locking plate rotatably mounted on said valve housing at the outside thereof, a ball valve mounted inside said valve housing for rotation about an axis perpendicular to the axis of the respective valve housing and connected to said locking plate to turn therewith between closed and open positions, an actuating ring rotatably mounted on the outside of said valve housing in front of said locking plate, said actuating ring having circumferentially spaced peripheral portions which block said locking plate from turning when positioned in front of said locking plate and between said circumferentially spaced portions presenting a radially inwardly offset peripheral portion which permits the locking plate to turn when said last-mentioned peripheral portion is in front of the locking plate, said actuating ring carrying a radially outwardly projecting pin at said radially inwardly offset peripheral portion, said locking plate having a forwardly-facing notch therein which is positioned to receive said pin as the actuating ring is turned so that the locking plate and the ball valve are turned as said pin moves past the locking plate, the actuating rings on the respective coupling units having circumferentially spaced forwardly-projecting portions with radially inwardly extending lips, said forwardly projecting portions of the actuating rings interfitting with each other circumferentially so that the actuating rings turn together, said valve housings at their front ends having radially outwardly extending projections which prevent the coupling units from being connected together except when said actuating rings are at predetermined angular positions on the respective valve housings, the respective ball valves being closed when the actuating rings are in said last-mentioned positions, the respective pins being unequally spaced circumferentially from the respective locking plates in said last-mentioned positions of the actuating rings so that the ball valves are opened in sequence as the actuating rings are turned, said ball valves extending contiguous to each other when the coupling units are connected to each other.

4. A valved coupling comprising first and second coupling halves detachably connected to each other in contiguous end-to-end relationship, said first coupling half having a first ball valve with an axial bore therethrough, and means for turning said first ball valve about a central axis therein extending perpendicular to the axis of said bore, said first ball valve having a recess in its periphery between the opposite ends of said bore, said recess being defined by a spherically concave surface, said second coupling half having a second ball valve of the same size as the first ball valve and with an axial bore therethrough of the same size as the bore in the first ball valve, said second ball valve being disposed contiguous to said first ball valve, means for turning said second ball valve about a central axis therein extending perpendicular to the axis of the bore therein and parallel to the turning axis of the first ball valve, said second ball valve between the opposite ends of its axial bore having a spherical peripheral surface complementary to said concave recess in the first ball valve, second ball valve being turnable about its turning axis when said concave recess in the first ball valve faces toward the second ball valve, the first ball valve being turnable about its turning axis when the axis of said bore in the second ball valve extends toward the first ball valve, and means on each coupling half locking the respective ball valve closed when said coupling halves are detached from each other and operable in unison after the coupling halves are connected to each other in contiguous relationship for turning said ball valves sequentially to their open positions in which their axial bores register with one another and for locking said valves in said open positions.

5. The valved coupling of claim 4 wherein said last-mentioned means comprises a locking plate on each coupling half connected to the respective ball valve therein so that each locking plate and the respective ball valve turn together, an actuating ring rotatably mounted on each coupling half to turn in front of the respective locking plate about an axis perpendicular to the turning axis of the respective ball valve therein, each said actuating ring having circumferentially spaced peripheral portions which block the respective locking plate from turning when either of said peripheral portions is in front of the locking plate, each said actuating ring having between said peripheral portions an inwardly offset peripheral portion which permits the locking plate to turn when said offset peripheral portion is in front of the locking plate, each actuating ring carrying a radially outwardly projecting pin at said radially inwardly offset peripheral portion, each locking plate having a forwardly-facing notch therein which is positioned to receive said pin as the respective actuating ring is turned so that said locking plate and the respective ball valve are turned as said pin moves past the locking plate, the actuating rings on the coupling halves having circumferentially spaced forwardly-projecting portions with radially inwardly extending lips, said forwardly projecting portions of the actuating rings interfitting with each other circumferentially so that the actuating rings turn together, means on said coupling halves for preventing the coupling halves from being connected together except when said actuating rings are at predetermined angular positions on the respective coupling halves, the respective ball valves being closed when the actuating rings are in said last-mentioned positions, the respective pins being unequally spaced circumferentially from the respective locking plates in said last-mentioned positions of the actuating rings so that the ball valves are opened in sequence as the actuating rings are turned, said ball valves when open having their respective axial bores aligned with one another.

6. In a valved coupling, a coupling unit comprising a locking plate mounted to turn about a predetermined axis, a rotatable valve coupled to said locking plate to be turned thereby between closed and open positions, an actuating ring mounted to turn past said locking plate about an axis perpendicular to said first-mentioned axis, said locking plate having a first arcuate surface which in one angular position of the locking plate closely overlies the periphery of the actuating ring and prevents the locking plate from turning throughout a range of turning movement of the actuating ring about its axis, said locking plate having at one end of said first arcuate surface a slot which is open toward the actuating ring, said locking plate having a second arcuate surface extending at the opposite side of said slot from said first arcuate surface, said second arcuate surface in a second angular position of the locking plate closely overlying the periphery of the actuating ring and preventing the locking plate from turning throughout a different range of turning movement of the actuating ring about its axis, said actuating ring having a reduced diameter peripheral portion which permits the locking plate to turn when said reduced diameter portion is beneath either of said arcuate surfaces, and a radially projecting member on said actuating ring at said reduced diameter peripheral portion thereof which is engageable in said slot to turn the locking plate as said reduced diameter peripheral portion on the actuating ring moves beneath either of said arcuate surfaces.

7. A valve coupling comprising first and second coupling members, each of said coupling members having a ball valve member rotatable between open and closed positons, said coupling members being adapted to interfit in coupling position with said valve members contiguous in the closed position, rotataing means for each of said valve members, unitary actuating means movable between first and second positions, means interconnecting said actuating means and said rotating means whereby when said actuating means is in said first position said valve members are in the closed position and when said actuating means is in said second position said valve members are in the open position, progressive movement of said actuating means from said first position to said second position sequentially shifting one of said valve members from the closed position to the open position and subsequently shifting the other of said valve members from the closed position to the open position after said one valve member has been shifted, and means operable by said actuating means to clamp said coupling members together when said actuating means is in said second position.

8. A valve coupling as set forth in claim 7 including locking means for each of said rotating means, said locking means being operable by said actuating means to lock said rotating means when said actuating means is in said first and in said second positions, said actuating means releasing said locking means intermediate said first and second positions.

References Cited by the Examiner

UNITED STATES PATENTS

| | | | |
|---|---|---|---|
| 2,440,946 | 5/48 | Hansen | 137—614.06 |
| 2,712,454 | 7/55 | Love | 137—614.01 |
| 2,872,216 | 2/59 | Kaiser | 137—637.05 |
| 2,948,553 | 8/60 | Gill et al. | 137—614.02 |
| 2,991,090 | 7/61 | De Cenzo | 137—614.02 |

FOREIGN PATENTS

| | | |
|---|---|---|
| 876,521 | 8/42 | France. |
| 708,527 | 5/54 | Great Britain. |

ISADOR WEIL, *Primary Examiner.*

MORRIS M. FRITZ, WILLIAM F. O'DEA, *Examiners.*